United States Patent [19]
Lafon et al.

[11] Patent Number: 5,889,272
[45] Date of Patent: Mar. 30, 1999

[54] COUPLER FOR MANAGING COMMUNICATION BETWEEN A PORTABLE DATA MEDIUM AND A DATA EXCHANGE DEVICE, AND DATA EXCHANGE DEVICE THEREFOR

[75] Inventors: Jean-Pierre Lafon, Chatillon; Bernard Deniau, Choisy le Roi, both of France

[73] Assignee: Bull CP8, Louveciennes, France

[21] Appl. No.: 913,248

[22] PCT Filed: Jan. 3, 1997

[86] PCT No.: PCT/FR97/00010

§ 371 Date: Sep. 10, 1997

§ 102(e) Date: Sep. 10, 1997

[87] PCT Pub. No.: WO97/25685

PCT Pub. Date: Jul. 17, 1997

[30] Foreign Application Priority Data

Jan. 12, 1996 [FR] France .................................. 96 00308

[51] Int. Cl.⁶ ...................................................... G06F 5/00
[52] U.S. Cl. .......................... 235/380; 235/492; 235/451; 902/26
[58] Field of Search .................................... 235/380, 375, 235/492, 451; 902/25, 26

[56] References Cited

U.S. PATENT DOCUMENTS 5,149,945 9/1992 Johnson .................................. 235/380

FOREIGN PATENT DOCUMENTS 0202622 11/1986 European Pat. Off. .
0670556 9/1995 European Pat. Off. .

OTHER PUBLICATIONS

Electronique Radio Plans, vol. 541, Dec., 1992, Paris, FR. pp. 43–47, XP000323501, Patrick Guelle: "Le Coupleur de Carte A Puce CCU 910 Corel".

Electronique Radio Plans, vol. 543, Feb. 1993, Paris, FR. pp. 35–39, XP000332002, Patrick Guelle: "L' Interface de Cartes A Puce Tda8000 Philips".

*Primary Examiner*—Anita Pellman Gross
*Assistant Examiner*—Diane I. Lee
*Attorney, Agent, or Firm*—Edward J. Kondracki; Kerkam, Stowell, Kondracki & Clarke, P.C.

[57] ABSTRACT

A coupler for managing communication between a portable data medium and a data exchange device. The coupler includes bistable control circuitry (25) input-activated by at least two control signals (DTR, RTS) delivered by the data exchange device in one of two first and second predetermined input sequences, and arranged to output at least one power supply signal (VCC) and a data medium reset signal (RST) in a predetermined output sequence, such that the portable data medium is activated only when one specific input sequence of the two input sequences is received.

8 Claims, 4 Drawing Sheets

COUPLER FOR MANAGING COMMUNICATION BETWEEN A PORTABLE DATA MEDIUM AND A DATA EXCHANGE DEVICE, AND DATA EXCHANGE DEVICE THEREFOR

BACKGROUND OF THE INVENTION

1. Field of the Invention

The present invention relates to a coupler for managing communication between a portable data medium and a data exchange device, which communication uses, on the data exchange device end, at least one data transmission signal and two control V signals delivered by the data exchange device in one of two first and second predetermined input sequences, and on the data medium end, at least one data medium power supply signal, one data medium reset signal, and one data transmission signal.

This coupler can be used for example to limit access to a computer network to authorized persons who hold for this purpose a portable data medium such as a chip card incorporating a microprocessor or micro-wired logical circuits which define areas to which access is controlled and can therefore contain secret information such as cryptographic keys (see for example the portable object described in U.S. Pat. No. 4,211,919).

2. Description of Related Art

The protocol for data exchange with a chip card is codified by international standard ISO7816-3, which defines the sequence for generating the signals applied to the chip card, namely a power supply signal VCC, a power supply signal for the memories VPP, a reset signal RST, a clock signal CLK, and a data exchange signal I/O. The standard very precisely defines the order in which these signals must appear and then disappear.

A coupler of this type can, in a known way, comprise a microprocessor which controls the interface with the portable data medium and is controlled by the data exchange device which constitutes the central processor. This microprocessor slows down the exchange process between the asynchronous data exchange device and the portable data medium.

In order to avoid the use of a microprocessor in the coupler, it has been suggested that some of the signals supplied by a serial port of the data exchange device, typically a port according to the standard RS 232, namely a "clear to send" signal CTS, a request to send signal RTS, a "data carrier detect" signal DCD, a "data terminal ready" signal DTR, a data transmission signal TX and a data reception signal RX, be used to generate the signals applied to the portable data medium.

A coupler of this type is described in U.S. Pat. No. 5,149,945. The sequencing of the signals supplied to the chip card is defined exclusively by the data exchange device, without the coupler's being able to intervene in this sequencing so as to allow for particular operating situations on the chip card end.

One consequence is that the above-mentioned standard is not always met, particularly when the chip card is reinserted after having been removed during a communication with the data exchange device, since the chip card is powered up again immediately, without allowing the data exchange device the necessary time to react in so as to impose a re-powering up in accordance with the standardized sequence.

However, it appears to be desirable for the coupler to be able to intervene in the sequencing of the signals delivered by the data exchange device in order to supply a wider range of modes for controlling or testing the chip card.

SUMMARY OF THE INVENTION

The object of the invention is to eliminate the above-mentioned drawbacks and for this purpose it relates to a coupler as described at the beginning of the specification, characterized in that:

it comprises bistable control means input-activated by at least the two control signals delivered by the data exchange device and designed to output at least the power supply signal and reset signal of the data medium in one of two first and second predetermined output sequences, which is a function of the input sequence;

the first input sequence alone is able to generate a first output sequence which successively comprises the power supply signal and reset signal of the data medium, which allow the data exchange device to enter into communication with the portable data medium.

Thus, the bistable control means make it possible to intervene in the sequencing of the signals delivered by the data exchange device so as to produce, or not to produce, from these signals and as a function of them, the signals directed to the chip card, which will be made clearer in the description of the appended figures. The bistable control means make it possible to control the chip card, both as a function of the instantaneous behavior of the data exchange device and as a function of that of the chip card.

The invention also relates to a data exchange device designed to manage communication with a portable data medium and comprising for this purpose data exchange means and coupling means such as the coupler defined above, which coupling means also comprise means for detecting the presence of the portable data medium, designed to deliver to the data exchange means a signal of the presence of the medium when the portable data medium is cooperating with the coupling means, upon reception of a first of the control signals, and which data exchange means are designed to cyclically send to the coupling means, before a communication with the portable data medium, the second input sequence until they receive the signal of the presence of the portable data medium.

BRIEF DESCRIPTION OF THE DRAWINGS

Other characteristics and advantages of the invention will emerge from the following description, given as an illustrative and non-limiting example, in reference to the appended drawings, in which.

DESCRIPTION OF THE PREFERRED EMBODIMENTS

Figure 1:
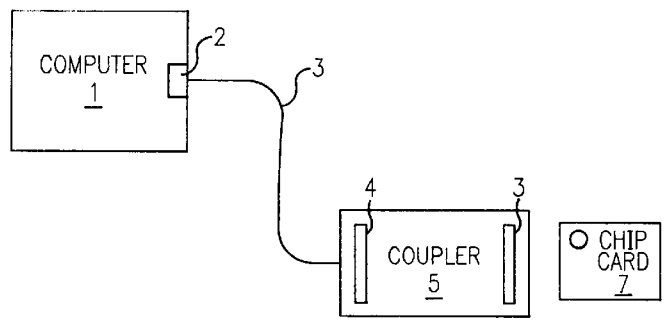
FIG. 1 represents a configuration comprising a coupler according to the invention.

FIG. 1 represents a typical configuration of a personal computer 1 wherein a port connector 2, for example for a serial port of the RS 232 type, is connected by a cable 3 to a serial port connector 4 of a coupler 5. The coupler 5 also includes a chip card connector 6 which can receive a chip card 7. The interface device coupler 5 serves to manage the data exchanges between the chip card 7 and the personal computer 1. The coupler 5 can, in particular, be used for security functions, for example to control access to computers or to computing networks, by providing authorized persons with a chip-based identification card.

Figure 2:
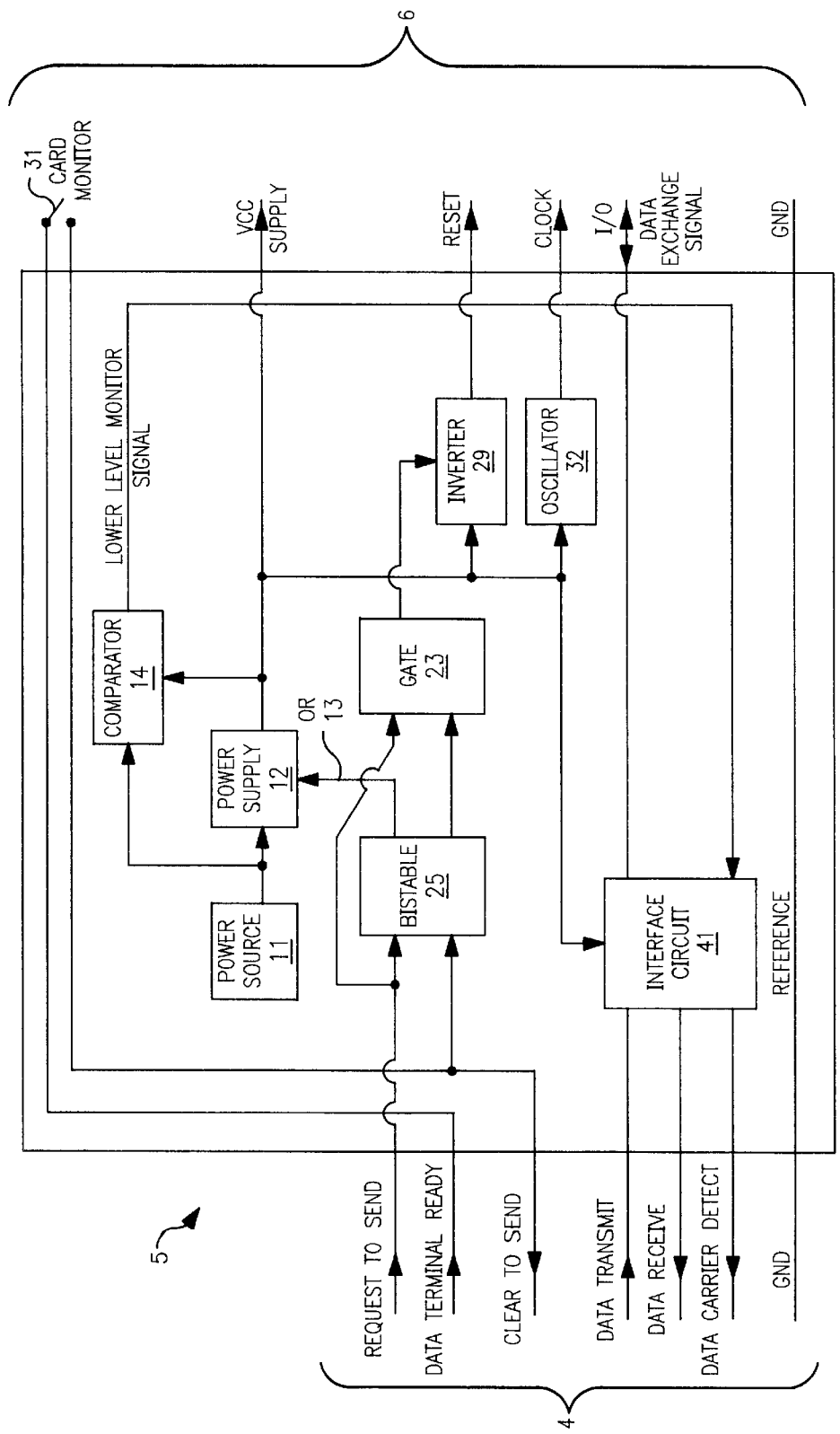
FIG. 2 is a block diagram of the coupler.

FIG. 2 is the block diagram of the coupler 5, which receives the signals RTS, DTR, CTS, TX, RX and DCD from the serial link of the computer 1 through the serial port connector 4; its chip card connector 6 includes plugs connected to the signals VCC, RST, CLK and I/O of the chip card as well as to a card presence switch 31 which is closed by the chip card when the latter is inserted into the connector 6.

The signal DTR, via a chip card switch 31, and the signal RTS are sent to a bistable circuit 25 which controls a power supply circuit 12 and a blocking circuit 23. The role of the bistable circuit 25 is to authorize, first of all, the provision of a supply voltage VCC directed to circuits of the coupler, particularly to circuits 29, 32, 41, and to the chip card 7, and secondly, the transmission of the reset signal RST through the blocking circuit 23. This authorization is delivered only if the signals DTR, RTS are activated in the order DTR, RTS.

The card presence switch 31 is connected to the signal CTS in order to return to the serial port connector 4 the chip card presence information.

The signal VCC is sent to an interface circuit 29 which generates the signal RST, to a clock generator 32 which generates the clock signal CLK, and to an interface circuit 41 which generates the signal I/O, thus guaranteeing that the reset, clock and data exchange signals RST, CLK and I/O, respectively have a voltage lower than that of the power supply signal VCC, since they are derived from the latter, in accordance with the requirements of the standard ISO7816-3.

The coupler 5 also includes a power source 11 which drives both the power supply circuit 12 supplying the regulated signal VCC, and a comparison circuit 14 which compares the level of the power source 11 with a reference, constituted in this case by the regulated signal VCC.

The comparison circuit 14 outputs a so-called "low" level of the power source and transmits it through the interface circuit 41 to the signal DCD.

The reference potential signal GND is transmitted directly from the computer to the chip card, through the coupler 5.

Figure 3:
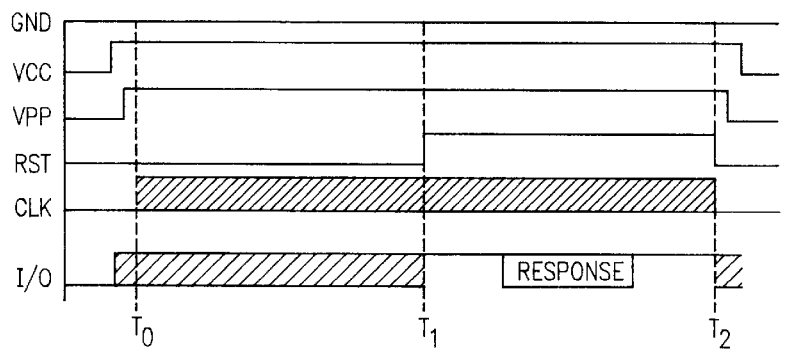
FIG. 3 illustrates the protocol for exchange with a chip card according to the standard ISO 7816-3.

Generally, data exchanges with a chip card are codified by the standard ISO 7816 whose section 7816-3 relates to the sequencing of the various signals applied to the chip card, namely the reference potential signal GND, the power supply signal VCC, the memory power supply signal VPP, the clock signal CLK, the reset signal RST and the data exchange signal I/O, as shown in the timing diagram in FIG. 3.

It may be seen that, during the establishment of the exchange, the signals VCC, VPP, CLK and RST must be supplied in that order; the signal VPP, which is generally not used, is short circuited by connection with the signal VCC. At the end of the exchange, the above-mentioned signals must disappear in the reverse order.

Figure 4:
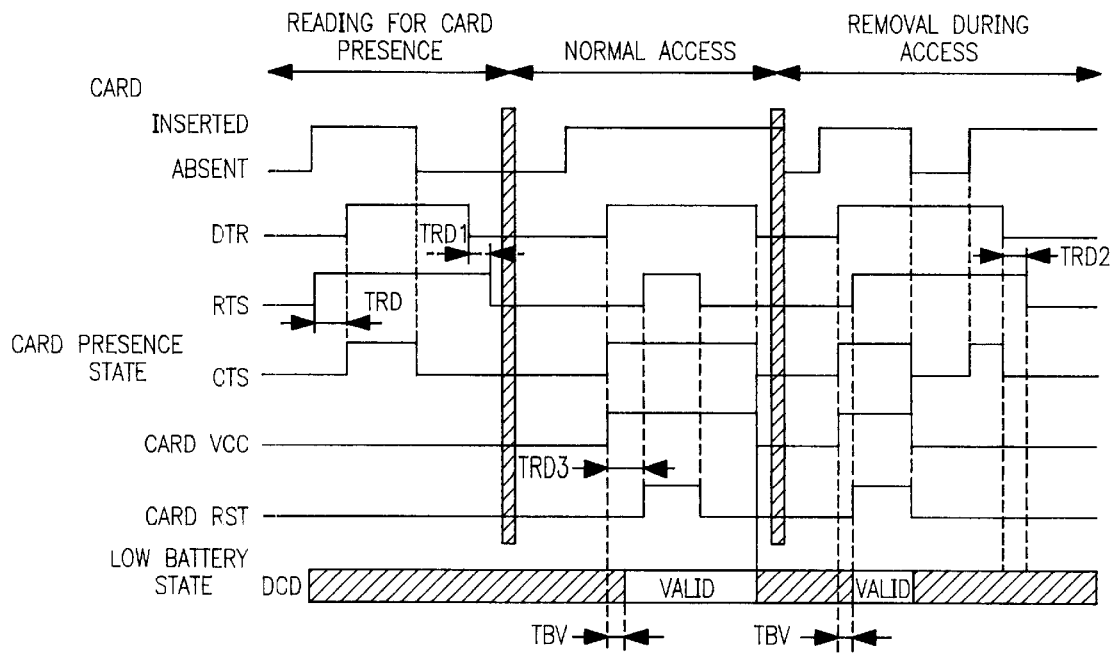
FIG. 4 represents the sequencing of the signals supplied by the data exchange device.

FIG. 4 is a timing diagram of the signals from the serial link of the computer that are sent to the coupler 5; it distinguishes three different types of operation, which correspond to the following three situations:

reading (that is, testing) for the presence of the chip card by the computer without supplying power to the chip card, thus without drawing on the voltage source 11;

normal access to the chip card while supplying it with power, for the purpose of a computer-chip card dialogue;

removal of the chip card during a normal access.

A first line of FIG. 4 defines the position of the chip card relative to the coupler and includes a high state corresponding to the case in which the chip card is inserted in the coupler not only so as to be in electrical contact with it but also so as to close the card presence switch 31, and a low state corresponding to the case in which the chip card is absent. The subsequent lines DTR and RST (bistable control circuit 25), CTS (chip card presence state), VCC (card power supply) and RST (card reset) also have two states, a high state and a low state, the first of which corresponds to an active signal. Finally, a last line DCD (low battery state) has alternating shaded and light areas, the latter including the comment "valid" indicating that it is possible to test the state of the battery.

In the first type of operation, it may be seen in particular that the computer sends the signal RTS before the signal DTR, which sequence is produced cyclically until the card is detected, which detection causes the transfer of the signal DTR to the signal CTS which indicates the card presence state, but not the activation of the signal VCC, since hypothetically in this case the DTR-then-RTS sequencing is not adhered to: consequently, neither the signal RST nor the signal DCD is activated. During a partial removal of the chip card while the three signals RTS, DTR and CTS are activated, only the latter CTS is deactivated. In order to produce a new DTR, RTS sequencing, the computer first brings these to signals to the low state in reverse order.

In order to conform to the intrinsic operating times of the bistable circuit 25, the time interval TDR which separates the two signals RTS and DTR (when the signal RTS is established before the signal DTR is active) is at least equal to a logic gate delay, that is on the order of several microseconds. The time interval TRD1 which separates the deactivation of the signal RTS from that of DTR has a length on the same order.

Preferably, the first type of operation will be triggered cyclically in order to detect the insertion of the chip card into the coupler before the chip card is powered up. Moreover, when it is desirable to verify the presence of the chip card at regular intervals during a communication that has already been established (particularly in order to make sure that the user of the coupler is in fact authorized and that the chip card has not been fraudulently replaced by a non-regulation chip card), this first type of operation will be re-triggered as many times as desired.

In the second type of operation, the computer sends the signal DTR before RTS in accordance with the requirements of the standard ISO7816-3. Unlike in the preceding type, the activation of the signal DTR while the chip card is fully inserted not only causes the activation of the signal CTS through which the chip card responds to the computer, but also that of the signal VCC, and the activation of the signal RTS causes that of the chip card reset signal RST, which triggers the effective operation of the chip card. It must also be noted that the activation of the signal VCC causes that of the signal CLK, which is not illustrated in FIG. 4, but which is shown in FIG. 3, before that of the signal RST.

At the end of the communication between the computer and the chip card, the computer first returns the request to send signal RTS to the low state, which causes the deactivation of the reset signal RST, then the computer returns the data terminal ready signal DTR to the low state, which causes the deactivation of the clock signal CLK, not illustrated in FIG. 4, but which is shown in FIG. 3, followed by the voltage drop of the signal VCC. As explained above in reference to FIG. 2, it is the fact that the voltages of the signals RST and CLK are derived from the voltage of the signal VCC which guarantees the sequencing.

Thus, it is noted that the sequencing of the signals DTR, RTS defined by the computer, in association with that defined by the coupler, makes it possible to meet the requirements of the standard ISO7816-3 referred to in FIG. 3 relative to the powering up of the chip card as well as its powering down. Also in order to comply with this standard, the duration TRD3 corresponds to the minimum time for the activation of RST by RTS after a powering up by DTR and the duration TBV corresponds to the wait time after the power up of the coupler, before a reading of the state of the battery.

The "low battery" state is transferred to the signal DCD if a supply voltage VBB, defined below in reference to FIG. 5, falls below the reference voltage. The following behavior is seen from the computer:

if the chip card has been powered up (DTR active) and the battery is good, the signal DCD is at the high level (−12 V on the line)

if the "low battery" signal DCD appears, DTR being active, the signal DCD takes the low value (+12 V on the line) with the time-out TBV relative to the signal VCC.

The low battery test can be performed until the end of the communication.

It will be noted that the second type of operation described above can either follow the first type of operation after an effective detection of the presence of the chip card, or be triggered directly.

In the third type of operation, while a computer-chip card dialogue has been established according to the second type described above, a removal of the chip card occurs, causing the deactivation of the reset signal RST, the clock signal CLK, not visible in FIG. 4, followed by the voltage drop of the signal VCC, even if this deactivation occurs over a shorter time period relative to the second type of operation. The low battery state signal DCD is also deactivated when the chip card is removed.

Advantageously, the only effect of reintroducing the chip card is to reactivate the signal CTS, without allowing a reactivation of the signals VCC, CLK and RST. This makes it possible to avoid the drawbacks caused by a known rebound effect of the card presence switch 31 which can randomly reactivate the power supply signal VCC, and consequently the clock and reset signals CLK and RST.

In this situation, the computer causes the deactivation of the data ready and request to send signals, DTR then RTS as in the first type of operation, with a time lag TRD2 identical to TRD1. The deactivation of the signal DTR causes that of the signal CTS, which was still at the high state.

Figure 5:
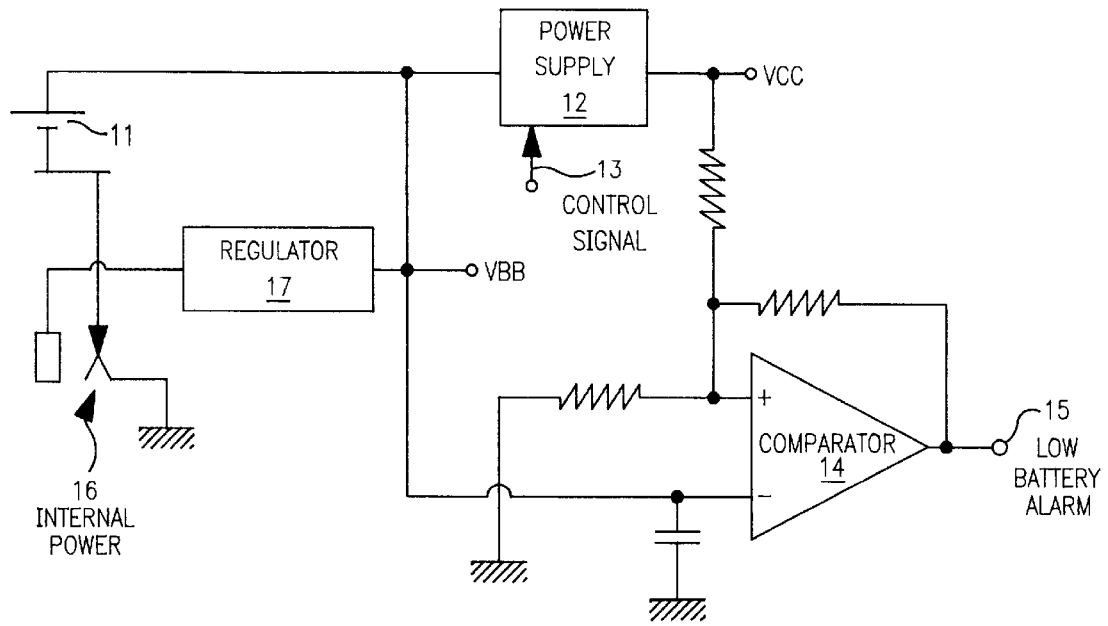
FIG. 5 is a partial diagram of the coupler relative to the internal power supply.

FIG. 5 is a first partial diagram of the coupler according to the invention and relates to the power supply of the coupler. This coupler comprises, in reference to FIG. 2, the electrical power source 11 which is integrated and constituted, in this case, by a voltage source comprising, for example, an electric generator such as an assembly of two batteries, a photovoltaic cell or a high-capacity capacitor. The voltage of this voltage source 11, VBB, available through a positive terminal of the latter, is sent to the power supply circuit 12 which is of a known type and supplies a standardized voltage VCC of 5 V, which is used in the coupler 5 and is also applied to the chip card 7. The power supply circuit 12 is controlled by a signal applied at 13.

The voltage VBB is also sent through a "low battery" detection circuit which essentially comprises the comparison circuit 14 of FIG. 2, which compares the voltage VBB to a threshold value obtained from the voltage VCC and supplies a "low battery" alarm signal through an output 15.

It is also possible to provide an external power supply that is sent through a jack 16 and is regulated by a regulating circuit 17 whose output is connected to the positive terminal of the voltage source 11 and thus to the power supply circuit 12.

This external power supply applied through jack 16 can also be used to recharge the voltage source 11 when it is rechargeable (battery or very high-capacity capacitor).

Figure 6:
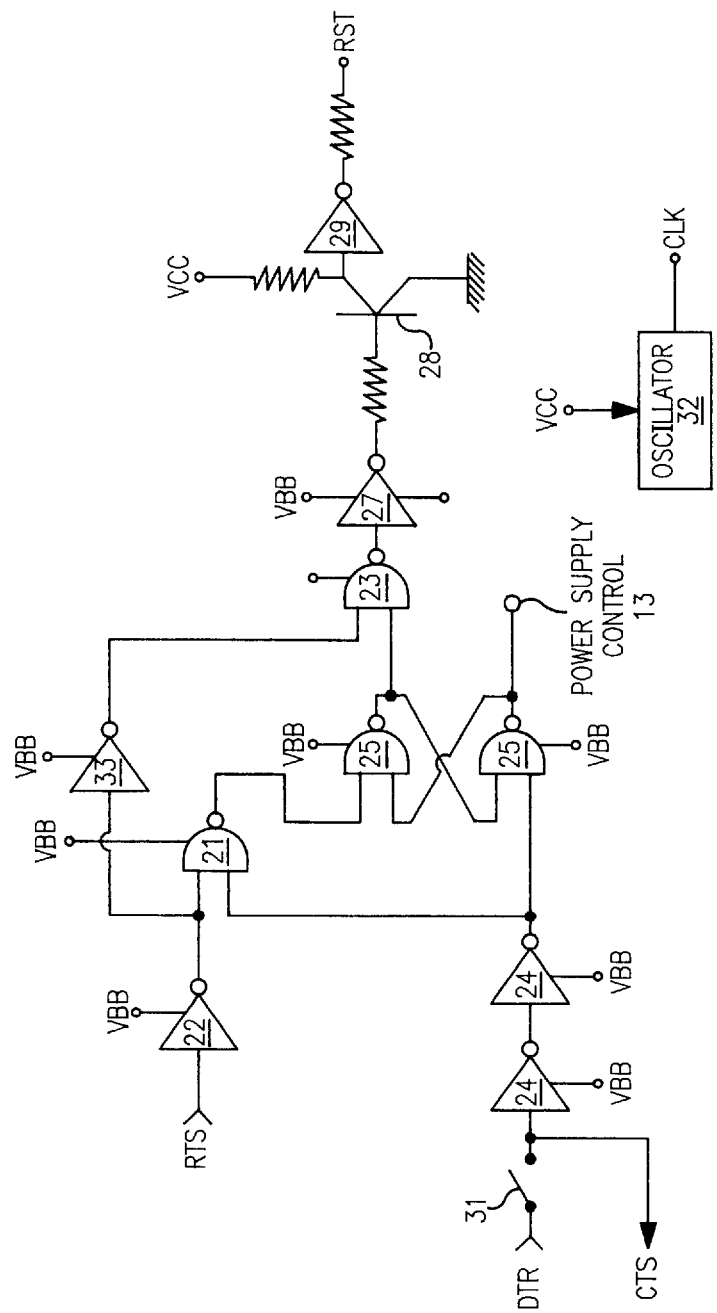
FIG. 6 is a partial diagram of the coupler relative to the generation of the control signals applied to the portable data medium.

FIG. 6 is another partial diagram of the coupler according to the invention, relative to the generation of the signals applied to the chip card 7 and the detection of the presence of the latter.

The request to send signal RTS drives a first input of a NAND gate 21 through an inverter 22; this first input is linked to a first input of another NAND gate 23, which constitutes the blocking circuit of FIG. 2, through another inverter 33. The data terminal ready signal DTR, through two serial inverters 24, drives a second input of the gate 21 and a first input of a bistable toggle 25 of the RS type corresponding to the bistable circuit of FIG. 2 and constituted by two NAND gates, a second input of which receives the output signal from the gate 21. A first output of the toggle 25 supplies, at 13, a power supply control signal, which corresponds to the terminal 13 of the power supply circuit 12 shown in FIG. 5.

The second output of the toggle 25 is sent to a second input of the gate 23 whose output, through an inverter 27, controls an NPN transistor 28 connected between the power supply voltage VCC and the ground, and whose collector supplies, through an inverter 29 constituting the interface circuit of FIG. 2, the reset signal RST. All the gates of the circuit in this figure disposed upstream from the transistor 28 are supplied by the voltage VBB of the voltage source 11 in such a way that the circuit is always on standby and can generate signals in the absence of the power supply signal VCC.

An input jack of the port connector 2 which delivers the data terminal ready signal DTR is connected to another jack of this same connector which receives the clear to send signal CTS through the card presence switch 31 associated with the chip card connector 6 and closed when the chip card 7 is in place in the connector 6.

Moreover, a quartz oscillator 32, which constitutes the clock generator of FIG. 2 and is activated by the power supply signal VCC, supplies the clock signal CLK with a delay corresponding to a logic gate delay, as shown in FIG. 3.

It may be seen that the logical circuit of FIG. 6 makes it possible to adhere to the sequencing of the signals VCC, CLK and RST. In effect, due to the fact that during a normal access, the data terminal ready signal DTR is applied first, which is controlled by software installed in the personal computer, the toggle 25 first supplies the power supply control signal 13 which activates the power supply circuit 12. The regulating circuit 12 then supplies the signal VCC. Next, when the signal RTS appears, the toggle 25 changes state and actuates the generation of the signal RST, which can only appear when the signal VCC has been established.

The clock signal CLK can only be produced after the establishment of the power supply signal VCC because the quartz oscillator 32 is controlled by the power supply signal VCC.

During a card presence read cycle (see FIG. 4), the data terminal ready and request to send signals DTR and RTS are applied in the reverse order and the toggle does not actuate the circuits for generation of the signals VCC, CLK and RST; in particular, the voltage source 11 remains on standby. The presence of the chip card closes the card presence switch 31, which sends the card presence information to the computer through the signal CTS; this card presence detection operation occurs without drawing on the voltage source, since the power supply circuit 12 is not activated.

The chip card presence information supplied by the signal CTS makes it possible to manage the presence of the chip card through the personal computer in real time; this makes it possible, in particular, to detect the removal of the chip card during the data exchange in order to perform a session sign-off (end of task).

Figure 7:
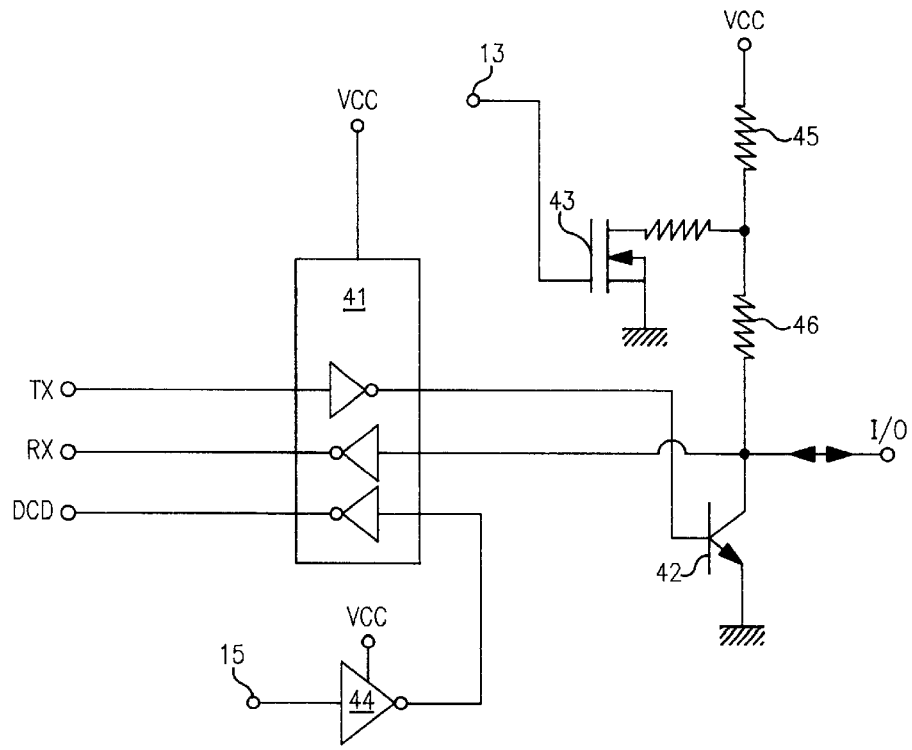
FIG. 7 is a partial diagram of the coupler relative to the transfer of the data signals.

FIG. 7 is another partial diagram of the coupler, whose chief function is to transfer data signals between the computer and the chip card. The interface circuit 41 of FIG. 2 performs a conversion of the signals TX, RX and DCD that it receives or produces. An NPN transistor 42 is provided, the collector of which is connected, through two series resistors 45, 46, to the voltage VCC, and the emitter of which is grounded. The base of the transistor 42 is driven by the signal TX issuing from the interface circuit 41, while its collector is connected to the I/O terminal of the chip card connector. This collector is connected to an inverter of the interface circuit 41 which outputs the signal RX.

The output 15 of the comparison circuit 14 of FIG. 5 drives an inverter 44 connected at its output to an inverter of the interface circuit 41 which outputs the "low battery" alarm signal DCD.

The interface circuit 41 and the inverter 44 are supplied by the voltage VCC.

The control signal 13 of the power supply circuit 12 of FIG. 5 controls a MOSFET field effect transistor 43 directly polarized with a positive voltage, which makes it possible to accelerate the drop of the power supply signal VCC and consequently of the signals CLK, RST and I/O during the powering down, in order to obtain a 5 V to 0.4 V drop time that is shorter than the sliding time of the contacts of the card, so as to comply with the standard ISO 7816-3, which specifies the need to have a voltage lower than 0.4 V at the moment the contacts are disconnected.

In operation, the interface circuit 41 ensures a multiplexing/demultiplexing between the signals TX, RX on one hand and I/O on the other hand. It is noted that the "low battery" signal DCD more generally constitutes an alarm signal which can detect other abnormal conditions such as a defective chip card producing a short circuit of the contacts.

The utilization of an integrated voltage source makes it possible to obtain the signals to be applied to the chip card in complete safety, without requiring a power supply from the personal computer, which is important in the case of portable computers.

Moreover, the coupler according to the invention has a simple design, which makes it possible to obtain a low cost price and a reduced size; thus, it is possible to produce an interface device whose dimensions are on the order of those of a chip card.

In the example described above, certain particular control signals RTS, DTR, CTS and DCD from the serial link of the data exchange device were selected to cooperate with the coupler, and each of them was assigned a particular function specific to the operation of a portable data medium. It is clear that the invention is not limited to this particular selection. More generally, any signal from the serial link which, in accordance with the communication protocol of this link, issues from the data exchange device, could play the role of any of the signals RTS, DTR or DCD; likewise, any signal from the serial link which, in accordance with the communication protocol of this link, returns to the data exchange device, could play the role of the signal CTS (for example, for an RS232 link, the signal DSR Data-Set-Ready).

Moreover, while the coupler described above is designed to carry out a serial data signal transmission, it is clear that the invention also applies to a parallel data signal transmission, in which case the data exchange device and the portable data medium comprise appropriate data interface means.

On the other hand, while the coupler described above was described as a device physically separate from the data exchange device and the portable data medium, it could naturally be integrated into either of these devices. In such as case, the connecting means between the device in question and the coupler, such as a connector or a cable described in relation to FIG. 1, could possibly be eliminated.

Moreover, in the second and third types of operation of FIG. 4, and according to a less preferred embodiment, no signal CTS is used. In effect, the powering up of the chip card in the second type of operation, and the powering down of the chip card in the third type of operation, do not require the management of this signal in order to comply with the standard ISO7816-3.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the appended claims.

We claim:

1. A coupler for managing communication between a portable data medium (7) and a data exchange device (1), which communication uses, on the data exchange device end, at least one data transmission signal and two control signals delivered by the data exchange device in one of two first and second predetermined input sequences, and on the data medium end, at least one data medium power supply signal, one data medium reset signal, and one data transmission signal, comprising:

a bistable control circuit (25) input-activated by at least said two control signals delivered by the data exchange device, and adapted to output at least said data medium power supply signal and said data medium reset signal, in one of two first and second predetermined output sequences, which is a function of said input sequence, said first input sequence alone generating a first output sequence successively comprising said data medium power supply signal and said data medium reset signal, which allows the data exchange device to enter into communication with the portable data medium.

2. A coupler according to claim 1, further comprising a circuit for detecting a presence of the portable data medium and delivering to the data exchange device a signal acknowledging the presence of the medium when the portable data medium is cooperating with the coupler, and upon reception of a first of said control signals, wherein sending of said second input sequence by the data exchange device allowing it to detect the presence of the portable data medium without the portable data medium being supplied with power.

3. A coupler according to claim 1, comprising signal generating means (29, 32) for generating reset and clock signals and operatively connected to:

receive said data medium power supply signal having a predetermined electrical level; and send to the portable data medium said reset signal and said clock signal derived in response to said power supply signal, said reset signal and said clock signal having an electrical level lower than said predetermined electrical level of the power supply signal.

4. A coupler according to claim 3, wherein said signal generating means (29, 32) further includes interface circuit means (41) adapted to receive said data transmission signal delivered by the data exchange device and to deliver to the portable data medium said data transmission signal in response to said power supply signal, said data transmission signal having an electrical level lower than said predetermined electrical level of the power supply signal.

5. A coupler according to claim 1, wherein:

the portable data medium is adapted to be cooperatively connected with the coupler through respective sliding contact means (6) on the coupler; and said bistable control circuit (25) comprise attenuation means (43) for attenuating the electrical level of the power supply signal during communication until a predetermined threshold level is reached, before said respective sliding contact means cease to be in mutual cooperation.

6. A coupler according to claim 1, further including:

a power source (11, 12, 23, 29) adapted to deliver, upon reception of an activation signal received from the bistable control circuit (25), said data medium power supply signal and said data medium reset signal; and the bistable control circuit being operatively connected to deliver to a power source said activation signal upon reception of said first input sequence.

7. A data exchange system for managing communication with a portable data medium (7) comprising data exchange means (1) and coupling means (5), said data exchange means adapted to generate for communication with a data exchange end of said coupling means at least one data transmission signal and two control signals delivered by the data exchange means (1) to one end of said coupling means, in one of two first and second predetermined input sequences, said coupling means adapted to deliver at a data medium end at least one data medium power supply signal (VCC), one data medium reset signal (RST), and one data transmission signal (I/O), characterized in that the coupling means (5) comprise:

a bistable control circuit (25) input-activated by at least one of said two control signals delivered by the data exchange means (1), said control circuit being operatively connected to output at least said data medium power supply signal and said data medium reset signal in one of two first and second predetermined output sequences, which is a function of said input sequence, said first input sequence alone being capable of generating a first output sequence successively comprising said data medium power supply signal and said data medium reset signal to allow the data exchange means (1) to enter into communication with the portable data medium;

sensor means (31) for detecting a presence of the portable data medium, and being operatively connected to deliver to the data exchange means (1) a signal acknowledging the presence of the portable data medium when the portable data medium is cooperatively associated with the coupling means (5), said coupling means being constructed and arranged such that upon reception of a first of said two control signals, said second input sequence by the data exchange means (1) is initiated and the presence of the portable data medium may be detected without the medium being supplied with power; and the data exchange means (1) being adapted to cyclically send to the coupling means (5), before communication with the portable data medium is established, a second input control signal until receipt of said signal acknowledging the presence of the portable data medium.

8. A data exchange device according to claim 7, in which the data exchange means (1) are adapted to send, upon detection of the presence of the portable data medium, said first input sequence.

* * * * *